United States Patent [19]

Ayers

[11] Patent Number: 4,726,904
[45] Date of Patent: Feb. 23, 1988

[54] APPARATUS AND METHOD FOR THE ANALYSIS AND SEPARATION OF MACROIONS

[75] Inventor: William M. Ayers, Princeton, N.J.

[73] Assignee: Senetek P L C, Aarhus, Denmark

[21] Appl. No.: 682,422

[22] Filed: Dec. 17, 1984

[51] Int. Cl.[4] .................. B01D 45/04; B01D 59/42; B01D 59/48
[52] U.S. Cl. ..................... 210/658; 204/155; 204/182.7; 204/299 R; 210/695; 210/748; 210/781; 210/198.3; 210/222; 210/243; 210/360.1
[58] Field of Search .............. 210/145, 148, 198.2, 210/198.3, 222, 223, 243, 251, 360.1, 657, 658, 695, 739, 748, 780, 781, 782, 789; 204/155, 180.1, 182.7, 182.8, 299 R, 300 R

[56] References Cited

U.S. PATENT DOCUMENTS

| | | | |
|---|---|---|---|
| 1,949,660 | 3/1934 | Roberts | 210/323 |
| 2,648,636 | 8/1953 | Ellis et al. | 210/695 |
| 3,113,103 | 12/1963 | Lowery | 210/657 X |
| 3,140,714 | 7/1964 | Murphy, Jr. et al. | 204/183.3 |
| 3,197,393 | 7/1965 | McEuen | 204/183.1 |
| 3,356,604 | 12/1967 | Iwata | 210/223 |
| 3,395,093 | 7/1968 | Liberti | 210/198.3 |
| 3,412,002 | 11/1968 | Hubby | 204/180.1 |
| 3,520,793 | 7/1970 | Kolin | 204/299 R |
| 3,522,162 | 7/1970 | Davies | 210/695 X |
| 3,556,967 | 1/1971 | Anderson | 204/299 R |
| 3,616,453 | 10/1971 | Philpot | 204/180.1 |
| 3,617,557 | 11/1971 | Giltrow | 210/657 |
| 3,719,583 | 3/1973 | Ustick | 210/222 |
| 3,844,926 | 10/1974 | Smyth et al. | 204/299 R |
| 4,238,326 | 12/1980 | Wolf | 210/223 |

Primary Examiner—Richard V. Fisher
Assistant Examiner—W. Gary Jones
Attorney, Agent, or Firm—Fitch, Even, Tabin & Flannery

[57] ABSTRACT

An apparatus for the separation of macroion groups from a mixture utilizing a three field device for generating forces on the macroions including means for applying a centrifugal force, means for applying a magnetophoretic force, and means for applying a constant or variable electrophoretic force. In a separation step the centrifugal and magetophoretic forces assist in forming the macroions in separate groups of concentric bands on a rotating platform. The constant electrophoretic force may be optionally used to assist in this step. In an analytical step to characterize the mass and charge of the macroions, the electrophoretic and magnetophoretic forces are used to oppose the centrifugal force to control and hold the macroion bands at fixed positions on the platform. A band detection means is used to characterize the positions of the macroion bands on the platform. The variable electrophoretic force may be optionally used in a detection part of the analytical step. Various embodiments of the band detection means are illustrated.

20 Claims, 18 Drawing Figures

FIG. 16A SEPARATION

FIG. 16B ANALYSIS

FIG. 16C DETECTION

APPARATUS AND METHOD FOR THE ANALYSIS AND SEPARATION OF MACROIONS

The invention pertains generally to an apparatus and methods for the separation of macroions, and is more particularly directed to such apparatus and methods which apply a number of external force gradients to a mixture of macroions whereby their separation may be obtained and their physical properties such as charge, mass distribution, and identity may be determined by their interaction with the external forces.

Mixtures of macroions such as polyelectrolytes, proteins, or amino acids are used in many biological and chemical investigations. In these investigations it is often necessary to separate and recover a particular type of macroion or all of the groups of macroions. Additionally, other such investigations require one to identify the characteristics of a particular macroion or the characteristics of all the constituent parts of the mixture. Such mixtures may normally be characterized by the mass, net ionic charge, and drag coefficients of the constituent macroions dissolved in a solvent of fixed ionic strength and dielectric constant. To separate the macroions, external forces may be applied selectively to the mixture in order to cause movement of each type of macroion to a separate group. When different groups have been established it is much easier to identify, characterize, and recover a particular macroion group than when they are masked by others in the mixture.

Because macroions have differing mass to charge ratios and ionic mobilities, they may be separated or moved by the application of external fields which produce forces which act on these properties. A movement or migration caused by an external electric field interacting with the macroion net charge is termed "electrophoresis." The electrophoretic force on a macroion of net charge q is equivalent to qE where E is the electric field. A migration caused by a centrifugal acceleration field acts on the mass m of a macroion. The centrifugal force on a macroion is equivalent to $m\gamma^2 r$ where r is the radial distance from the center of rotation, and where $\gamma$ is the angular velocity of the rotating medium and equal to $2\pi\omega$ where $\omega$ is in revolutions/sec.

In addition to these two forces, it is possible to produce a third force on the macroions due to an interaction between a moving charged particle and a magnetic field known as a Lorenz force. The Lorenz force produced on a particle of charge q, moving with a velocity V, in a magnetic field B is equal to the vector cross product qVXB where V and B are vectors and q is a scalar.

Previously, the primary method for the separation and characterization of macroions has been electrophoresis. Both one dimensional and two dimensional electrophoresis apparatus are used to separate macroions by their charge. The major hinderance to achieving a high resolution in electrophoretic separation is Joule heating in the separation mixture. The Joule heating, caused by the ionic current flow during electrophoresis, produces thermally induced density gradients and convection within the mixture and hence a counterproductive random mixing of the macroions. This unwanted mixing action produced by the power dissipated by the separation mechanism limits the resolution or completeness of the separation.

Efforts to decrease the effects of the thermal convection currents include adding thickening agents (such as gels or polymers) to the separation mixture. However, these measures only partially suppress the unwanted thermal mixing. Hence, extraordinary measures have been explored to eliminate the thermal mixing. One such measure entails carrying an electrophoresis apparatus into orbit with the Space Shuttle. This approach decreases the thermal mixing by eliminating gravity and hence density gradients in the mixture. The National Aeronautics and Space Administration has recently performed electrophoretic separation of proteins on a Space Shuttle mission and offers this approach to the biological community as a commercial service.

A second problem that limits the resolution of electrophoretic and most other separation techniques involves Rayleigh diffusion. Rayleigh diffusion occurs when a mixture flows along a channel because of its parabolic radial velocity profile while moving through the channel. The Rayleigh diffusion is perpendicular to the direction of flow, i.e. radial diffusion in the presence of axial flow. This radial diffusion produces mixing and dispersion of the constituent macroions in the mixture. Rayleigh diffusion is proportional to axial flow velocity and thus zero radial diffusion is approached as the axial velocity of the macroion mixture approaches zero. However, for a zero axial velocity there is no separation with electrophoresis and a very low axial velocity increases the time needed for separation of the mixture.

SUMMARY OF THE INVENTION

The invention provides an apparatus and method for separating macroions in a solution by using combinations of field forces to facilitate the separation of similar macroions into groups. The preferred combination of field forces uses a centrifugal force to move a macroion radially outward with respect to a center of rotation, and a Lorenz force either opposing or assisting a radially directed centrifugal force. In addition to the former combination of forces, an alternating or constant electophoretic force, either opposing or assisting the radially directed centrifugal force, can be provided as a third force to separate the macroions.

It is therefore the object of the invention to provide a method of using combinations of these three radially directed forces (electrophoretic, centrifugal, and Lorenz) to separate mixtures of macroions into individual groups more quickly and with greater resolution than devices now used for such purposes.

In a first implementation, the centrifugal force on a mixture of macroions is controlled by the angular velocity of a platform on which the mixture is placed. A magnetic field, generated by an electromagnet, is applied perpendicularly to the plane of rotation and acts to generate a Lorenz force on the macroions directed radially along the same line of movement. A speed controller is used to vary the angular velocity of the platform to cause a variable but controllable centrifugal force and a current control is used to vary the magnetic field produced by the electromagnet to cause a variable but controllable magnetophoretic force.

For a separation the speed controller rotates the platform initially at a maximum speed to start the separation step of the process. To aid in this preliminary separation step, the current controller causes the Lorenz force to be directed in the same direction (outwardly from the center or rotation) as centrifugal force thus producing a combined additive force. Under the influence of these two field forces, the macroions will begin to separate into concentric bands according to their mass to charge ratio on the platform and will move radially outward with a radial velocity. The concentric bands will accelerate until they reach a fairly constant radial velocity of movement.

Once the concentric bands have been formed, the Lorenz force is reversed in direction to oppose the centrifugal force to control the position and the velocity of the bands on the platform. This position control enhances the separation process and permits precise characterization of the constituent components of the mixture. By providing a Lorenz force that is equal and opposite to the centrifugal force a particular group of macroions can be held at a fixed position thereby separating them from the rest of the mixture. Other groups of macroions are held at different fixed positions for the same magnetic field B, and angular velocity $\gamma$ where their positions are dependent upon their mass to charge ratios.

In electrophoretic devices, the electrolyte and other macroions electrostatically screen the applied electric field from the separated groups of macroions. This screening phenomenon creates discontinuities in the electric field and limits the resolution of the separation. When controlling the separation with the Lorenz force developed from the magnetic field there is no screening effect because the magnetic susceptibility of the electrolyte and macroions is extremely low.

Additionally, advantage is taken of the extremely large tangential velocities which can be produced by rotating the platform and the fact macroions in solution have a net electrostatic or ionic charge. Therefore, a relatively large and controllable radial Lorenz force can be produced on macroions moving on the platform. The radial Lorenz force is equal to $qV_tXB$ where $V_t$ is the tangential velocity of a macroion and is given by $2\pi r\omega$. The tangential velocity is thus dependent upon the radial distance r from the center of the rotation and the angular velocity $\omega$ of the platform.

In a second implementation of the invention, a constant electrophoretic force is used in conjunction with the Lorenz force and the centrifugal force. The electrophoretic force is developed by an electric field applied radially to the macroion mixture. In the separation step, the Lorenz and centrifugal forces are directed in the radially outward direction with respect to the center of rotation and produce a rapid separation of the macroions into the concentric bands.

Once the concentric bands have been formed, the electrophoretic force is turned on and it and the Lorenz force are reversed in direction to oppose the centrifugal force to control the position and velocity of the concentric bands on the platform. The second implementation therefore uses the Lorenz force to assist in the separation step of the separation and characterization process thereby minimizing power dissipation and any thermal convection that would have occurred if an electrophoretic force with its associated Joule heating of the medium was used. The final positioning and grouping of the macroions is produced by the combination of the Lorenz, electrophoretic and centrifugal forces which increases the resolution available from the system.

When the separation is complete an alternating electrophoretic force can be applied to the mixture in combination with the oppositely directed Lorenz force. The alternating electrophoretic force produces oscillation of the radial position of each macroion band so that they can be more easily detected and identified. Further, the resolution of the characterization is enhanced by noting the center of the oscillation as the position of the macroion group.

The electrophoretic force can be much smaller than that usually used for separation and is used mainly for balancing the Lorenz and centrifugal forces to provide a stable control of position or as a perturbator to be used in the identification process. Because the power level for the electrophoretic force is reduced substantially the problems previously encountered with convection currents caused by Joule heating is alleviated.

These and other objects, features and aspects of the invention will be readily apparent and more fully described upon reading the following detailed description in conjunction with the appended drawings wherein:

DETAILED DESCRIPTION OF THE PREFERRED EMBODIMENTS

To better understand the interaction of the three forces on the macroions, the position and velocity equations for a single macroion type will be described. Consider a macroion of mass m, and net charge q, on the surface of a rotating disk. The disk has an angular velocity $\gamma$, about the rotational axis and the macroion is subject to a radial electric field E, and a magnetic field B perpendicular to the plane of rotation. Because the tangential velocity $\gamma r$ and magnetic field B are perpendicular, the sine of the 90° angle between them is 1 and the vector cross product of the Lorenz force reduces to $q\gamma rB$.

By noting that the summation of forces on a macroion equals the product of its mass and its acceleration, the radial acceleration of the macroion along a radius r can be represented as:

$$m \frac{d^2r}{dt^2} = m\gamma^2 r + q\gamma rB + qE - f\frac{dr}{dt} \quad (1)$$

where f is the drag coefficient opposing the radial movement, and $\gamma$ is $2\pi\omega$ where $\omega$ is the rotation rate in revolutions/sec.

With the reasonable assumption that the acceleration term quickly approaches zero and a constant radial velocity is obtained, then the radial velocity is given by:

$$\frac{dr}{dt} = \frac{1}{f}[(m\gamma^2 + q\gamma B)r + qE] \quad (2)$$

Rearranging equation (2) and solving this first order differential equation for the dependence on the macroion position r yields:

$$r = r_0 + \frac{qE}{m\gamma^2 + q\gamma B} \exp(m\gamma^2 + q\gamma B)\frac{t}{f} - \frac{qE}{m\gamma^2 + q\gamma B} \quad (3)$$

where $r_o$ is the initial position.

Equation (2) can be re-arranged to give the macroion radial position, when the electric and magnetic fields oppose the centrifugal force to produce zero radial velocity:

$$r = \frac{-qE}{m\gamma^2 + q\gamma B} \quad (4)$$

or $$r = \frac{qE}{m\gamma^2 + q\gamma B} \quad (5)$$

if the net macroion charge is negative.

Equations (4) or (5) establish the criterion for the separation of a macroion of charge q, and mass m, from other macroions in the mixture. If the distance r is measurable and the electric field E, magnetic field B, and angular velocity $\gamma$ are known then the charge to mass ratio q/m can be calculated from these equations. Other groups or types of macroions with different mass and charge values will be held at different fixed positions r', r'', etc. for the same E, B and $\gamma$.

If only a two-force separation is desired and the electrophoretic force is not utilized, then Equation (2) simplifies to:

$$\frac{dr}{dt} = \frac{1}{f}[m\gamma^2 + q\gamma B]r \quad (6)$$

This first order differential equation has the solution:

$$\ln\left(\frac{r}{r_0}\right) = \frac{(m\gamma^2 + q\gamma B)}{f} t \quad (7)$$

where $r_0$ is the initial position of the macroion, and t is the time from the initial position.

When the position of the macroion is desired as a function of time, equation 7 can be rewritten in the form of:
ti $r(t) = r_0 \exp^{kt}$ (8)

$$r(t) = r_0 \exp^{kt} \quad (8)$$

where $k = \frac{m\gamma^2 + q\gamma B}{f}$

This equation indicates that the radial position of a macroion will change exponentially with time after the application of the centrifugal and Lorenz forces. If the Lorenz force $q\gamma B$ in the exponential function opposes the centrifugal force and is larger, such that $k<0$, then the macroion will move toward the center of the rotation. If, on the other hand, the Lorenz force acts in the same direction, or is smaller than the centrifugal force, such that $k<0$, then the macroion will move away from the center of rotation. Therefore, the radial movement of the macroion may be controlled toward or away from the center of the rotation by controlling the angular velocity $\gamma$ and the magnetic field B which, in turn, control the centrifugal force and Lorenz force respectively. The use of only the Lorenz force and the centrifugal force greatly reduces the amount of power dissipated in the separation medium when compared to the substantial Joule heating power dissipation that accompanies the use of an electrophoretic force. This is a principal advantage of the device in that the reduced power dissipation decreases the unwanted thermally induced mixing in the separated macroion bands and hence provides more distinct separation of macroions than conventional devices.

Using just the Lorenz and centrifugal forces, the macroions can be characterized by their radial positions and the time rate of change of their positions. To evaluate the mass charge ratio of a particular macroion from the positional information of Equation (8), consider a plot of ln (r) as a function of time for each macroion band. This graphical function yields a straight line with a slope equal to k given in Equation (8). Adjusting the magnetic field B or the rotational velocity $\gamma$ will change the value of the slope. Now if the Lorenz force is applied such that it opposes the centrifugal force and produces a radial position for a macroion group which is constant, then the slope will be zero (k=0). If the slope is zero, this suggests that:

$$\frac{m\gamma^2 + q\gamma B}{f} = 0 \quad (9)$$

which can be alternatively written as:

$$\frac{m}{q} = \frac{B}{\gamma} \quad (10)$$

Equation (10) states that by determining the values of B and $\gamma$ where k=0, a method is shown which will directly provide the value for the ratio of the macroion mass to its net ionic charge m/q.

Similarly, if one were to set the magnetic field B equal to zero then this suggests that:

$$k = \frac{m\gamma^2}{f} \quad (11)$$

which can be alternatively written as:

$$\frac{m}{f} = \frac{k}{\gamma^2} \qquad (12)$$

Equation (12) indicates that by knowing the radial positions of the macroion group and by calculating the slope of the macroion position K that a direct calculation can be used to provide the mass to drag coefficient ratio m/f.

The electric and magnetic fields, as well as the macroion net ionic charge and drag coefficient assumed in the development of these equations, are dependent on the medium in which the separation takes place. The net charge and conformation of the macroion are functions of the dissociation constants of its ionizable groups and covalent structure, respectively. Approximate models for the conformation of a macroion suggest that one can obtain the drag coefficient f from the conformation, $$f = 6\pi c\eta <s^2>^{1/2} \qquad (13)$$

by analogy to Stokes Law. Here $<s^2>^{1/2}$ is the root-mean square radius of gyration and c is an empirical constant. If data on the diffusion of the macroion is available, the Einstein relation, $$f = \frac{kT}{D} \qquad (14)$$

provides an alternative, approximate value where D is the diffusivity of the macroion.

A principal advantage of the invention is that the opposition of forces holds the macroion at one position and eliminates the need to estimate the frictional drag coefficient f. Therefore, in addition to the primary function of separation of macroions, holding a macroion at a fixed position with two or three fields provides an accurate determination of two important macroion properties, mass m and net charge q.

If one makes the reasonable assumption that the current i is carried only by the electrolyte or ionizable solvent in which the macroions are suspended, and that there are no concentration gradients of these current carriers far from the electrodes, then the electric field E is given by, $$E = -\nabla \phi = \frac{i}{F^2 \sum_{i=1}^{i=n} (Z_i)^2 C_i \mu_i} \qquad (15)$$

where the $\mu_i$ are the conventional mobilities and the concentrations, $C_i$, are in equivalents.

This is an adequate definition of the field at a macroscopic or transport level, however, it embodies the electroneutrality assumption of, $$\nabla^2 = \frac{\rho}{\epsilon} = -\frac{F}{\epsilon} \sum Z_i C_i = 0 \qquad (16)$$

The Debye-Huckle analysis states that the charge distribution near the macroion decreases exponentially with distance from the macroion so that, $$4\pi \int_0^\infty \rho(r')^2 dr' = q \text{ (Macroion)} \qquad (17)$$

Here r' is the radial distance from a macroion. Thus, the external field in the vicinity of the macroion is not the same as that described by Equation (9) since there is a net charge density about the macroion. It is this distorted local field that interacts with the macroion and provides the electrophoretic force.

The interaction of the magnetic field with the macroion charge, however, is more straightforward. The variation of a magnetic field passing through a medium other than a vacuum is governed by the permeability of the medium. The permeability is defined as, $$\mu = \mu_0(1+x) \qquad (18)$$

where x is the susceptibility. For all materials other than ferromagnetic materials, x is approximately zero, e.g. x for water is approximately $1 \times 10^{-6}$. Thus, the magnetic field acting on the macroion charge is not distorted by the distribution of counterions about the macroion. Hence, positioning of the macroion with the magnetic field B provides a more accurate value for the net charge than attainable with electrophoresis.

The magnetic field in Equation (1) is described by the relation, $$B = \mu_0 H \qquad (19)$$

where H is equal to the curl of the current density in the electromagnet 24 and $\mu_0$ is $4 \times 10^{-7}$ Weber/amp-meter.

It should be noted that each macroion has two velocity components, a tangential velocity due to the rotating platform and a radial velocity due to the forces described in Equations (3) and (8). Thus, each macroion has a Lorenz force applied to it not only in the radial direction but also in the tangential direction. However, the tangential Lorenz force is insignificant to the operation of the device because the tangential velocities are several orders of magnitude greater than the radial velocities and the forces are in proportion thereto.

Figure 1:
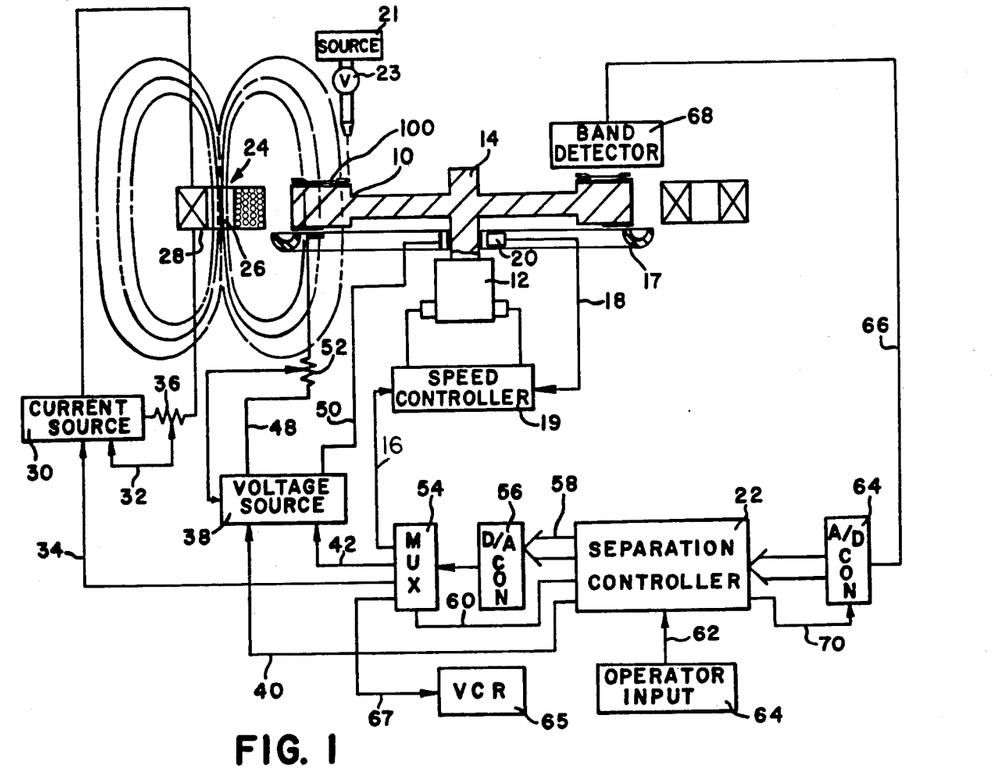
FIG. 1 is a system block diagram of a separation apparatus for mixtures of macroions constructed in accordance with the invention.
Figure 2:
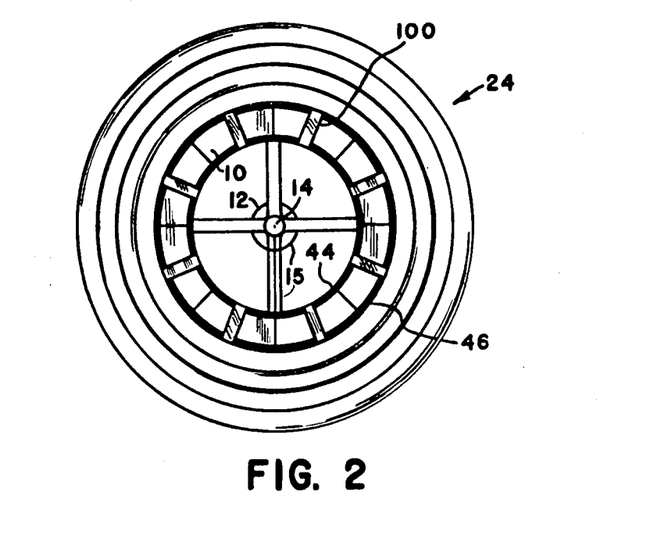
FIG. 2 is a top view of the rotor and electromagnet of the separation apparatus illustrated in FIG. 1.

An apparatus for the analysis and separation of macroions which is constructed in accordance with the invention is illustrated in FIGS. 1 and 2. In FIG. 1, a side view of the apparatus shows a generally flat disk-shaped platform 10 for mounting specimens of mixtures containing macroions which are to be analyzed for their characteristics or separated. As will be more fully described herein, this apparatus may be used as a separator specifically, or as an analyzer, or both.

Each specimen of a different macroion mixture can be mounted on a separation strip 100 which preferably is formed of a thin sheet of cellulose acetate, polyacrylimide, filter paper, or the like. The separation strips are usually narrow 1-2 mm. and between 2-3 cm. long. A small volume of the mixture is placed on one end of the strip 100 which is attached to the inner rim 44 of the platform 10. The other edge of the separation strip to which the macroions are migrating is attached to the outer rim 46 of the platform 10.

The platform 10 is rotated about the axis of a shaft 14 of a DC motor 12. The direct coupling of the platform 10 to the motor shaft 14 provides a much more precise speed control for the rotation of the platform than would be available with other coupling mechanisms. The rotational velocity of the platform 10 is regulated by a speed controller 14 which generates an electrical motor drive signal from a speed reference signal input on line 16 and an actual speed signal input to the controller on line 18. The speed reference signal, as will be more fully described hereinafter, is generated by a separation controller 22 and is the commanded rotational velocity of the platform 10. The actual speed signal on line 18 is generated by a tachometer 20 and is representative of the actual rotational velocity of the platform 10. The speed controller 14 maintains the rotational velocity of the platform 10 at the reference or commanded speed by a conventional closed loop control using the actual speed signal for feedback.

The platform 10 is rotated at different velocities to produce a variable centrifugal field on specimens of macroionic mixtures mounted thereon. The magnitude of the centrifugal force developed by the centrifugal field on any macroion will depend upon the mass m of the macroion and the rotational velocity $\omega$ of the platform 10. The direction of the force will be radially outward from the center of rotation about the axis of shaft 14.

About the periphery of the platform 10 is located a ring shaped electromagnet 24. The electromagnet 24 has either an air or a ferromagnetic core 26 to concentrate the flux lines generated by windings 28 which are wrapped circularly about the core. This configuration produces lines of magnetic flux which are concentrated in the core 26 and branch into two identical mirror image lobes to produce a generally toroidally shaped field about the electromagnet 24. One of the lobes is brought into propinquity with the platform 10 such that the surface is subjected to a magnetic field B substantially perpendicular to the plane of rotation of platform 10.

The sense and intensity of the magnetic field B are controlled by a current source 30 which feeds electromagnet 24 with power. By switching the direction of current flow through the windings 28, the sense of the magnetic field applied to the platform 10 can be reversed and by controlling the amplitude and frequency modulating the current, the intensity of the field can be controlled. The current source 30 receives via line 34 a reference current signal indicative of the sense and intensity of the magnetic field which is to be applied to platform 10 and differences this signal with an actual current signal generated by current sensor 36 via line 32. The reference current signal is generated by the separation controller 22, as will be more fully described hereinafter, to control the sense and intensity of the magnetic field B.

The magnetic field produces a magnetophoretic force on the specimens of macroionic mixtures on the platform 10. The magnetophoretic force is proportional to the vector cross product of the magnetic intensity and charge Bq and the tangential velocity $V_t$ of the macroion. Because of the rotation of the platform 10, the macroions will have a velocity component directed tangentially to their rotation. The perpendicular orientation of the magnetic field B to the tangential velocity vector will provide a magnetophoretic force directed orthogonal to the plane formed by them, i.e. either radially inward or outward depending upon the sense of the magnetic field B and the direction of platform rotation. Further, the magnetophoretic force will either assist or oppose the centrifugal force on a macroion depending upon its direction. The amount of magnetophoretic force and its effect will be thus proportional to the intensity of the magnetic field B, the charge q on a macroion, the speed of rotation $\omega$, and the macroion distance r from the rotation axis.

Another means for generating a field on a specimen of a macroionic mixture on the platform 10 is a voltage source 38. The voltage source 38 applies an electric potential between conductive rings 44 and 46 such that a corresponding voltage gradient or field E is developed therebetween. The potential from the voltage source is applied to the outer ring 46 via conductor 48 through a sliding contact with a conductive extension of the ring 46 beneath the rotor. The potential from the voltage source 38 is applied to the inner ring 44 through a sliding contact with the shaft 14 of motor 12. The potential is transferred from the shaft to the inner ring 44 via a conductor 15 running along one of the radial arms of the platform 10.

The potential field generated between rings 44, 46 is of variable intensity and polarity. Further, the field can be generated as either a DC field or an AC field. The voltage source 38 receives a reference voltage signal via line 42 which is indicative of the desired intensity and polarity of the electric field E to be applied to rings 44,46 and receives a switch voltage signal via line 40 which is indicative of whether the voltage should be AC or DC. The voltage source then controls its output to produce the desired potential field from these signals and a feedback signal from a voltage sensor 52 which indicates the actual potential applied. The reference voltage signal and switch voltage signal are generated by the separation controller 32 to regulate the electrophoretic force.

The electric field applied between rings 44,46 generates an electrophoretic force on the macroions of a mixture mounted on the platform 10. The force is directed either radially outward or inward depending upon the polarity of the field and has an amplitude proportional to the strength of the electric field E. Thus, an electrophoretic force on the macroions is developed which either assists or opposes the centrifugal field.

The separation controller 22 is a microprocessor based controller which regulates the analysis and separation process. The controller 22 at predetermined times generates digital control words to a digital to analog converter 56 for conversion of the control word to an analog form. The analog form of the digital control words are multiplexed to the control lines 16, 34 and 42 as the reference signals for the speed, current, and voltage controls, respectively. A selection line 60 from the separation controller 22 provides the timing for the generation and multiplexing of the these signals. The switching signal on line 40 is generated by the separation controller 22 as a digital logic level where one level indicates that a DC voltage should be generated and the other level indicates an AC voltage should be generated.

The separation controller 22 additionally receives a digital word periodically from an analog to digital converter 64. The A/D converter is read by the separation controller 22 by selecting the device and commanding a conversion via a control line 70. The parameter converted into a digital value is an analog signal on line 66 which is output from a band detection means 68. The band detection means 68 is a sensor which converts the image position of the particular groups of macroions into an analog signal which is then digitized by the A/D converter 64 and then input to the separation controller 22. Operator inputs to the separation controller via line 62 from an operator keyboard 64 are used to describe the operation, control the process, sequence, and recordation of results of the separation controller 22. The separation controller 22 is additionally adapted to transfer the position signals input from A/D converter 62 to D/A converter 56. The transfer can be made for converting the information to an analog form conducive with recording them on a mass storage device such as a video cassette recorder 65.

In general, the separation controller 22 receives the operator inputs from keyboard 64 and the position signals from the band detector 68 to control the generation of the reference speed signal, the reference current signal, and the reference voltage signal. By controlling these signals, and thereby the centrifugal, magnetophoretic, and electrophoretic forces on the macroions, a separation of the macroions or an identification and analysis of the mixture containing them is advantageously facilitated. The resulting separated groups can be collected in the U-shaped trough 17 and the results of the analysis recorded on VCR 65.

Figure 3:
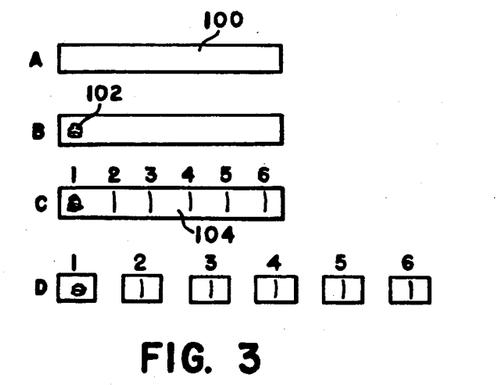
FIG. 3 a composite pictorial drawing of the steps of the analysis and separation process for a macroion mixture involving a separation strip as illustrated in FIG. 2.
Figure 4:
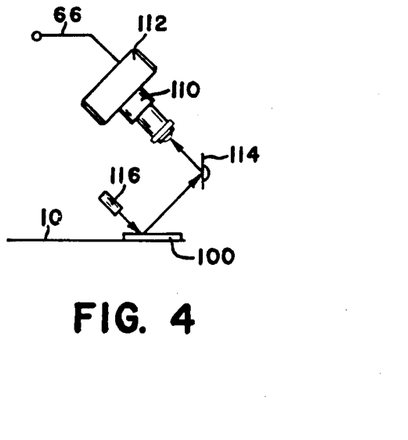
FIG. 4 is a detailed schematic diagram of the band detection means illustrated in FIG. 1.

FIGS. 3 and 4 illustrate one utilization of the apparatus 22 which was previously described. In this method both a separation and analysis of the macroions of a mixture are performed. With respect now to the process flow chart illustrated in FIG. 14 a mixture containing a plurality of different macroion groups is placed in block A10 on a separation strip 100 obtained in block A8. This step is illustrated in FIG. 3 where a specimen 102 of approximately 10 mm. of a mixture is placed on one end of a separation strip 100 in steps A and B. The strip 100 is attached to the platform rotor of the separation device 22 in block A12. The process is then continued by separating the mixture into separate groups of macroions or bands in block A14. When the combination of centrifugal, electrophoretic, and magnetophoretic forces have been used to provide a separation as shown in step C of FIG. 3, then the strip 100 is removed from the rotor in block A16. The separation strip 100 is then cut into individual pieces in block A18 to isolate one group of macroions from the other bands or groups. This step is illustrated as reference D of FIG. 3. These individual groups of macroions which have been separated by the apparatus may then further be analyzed in block A20 by separate chemical tests, spectroscopy, or the like.

Figures 14, 15:
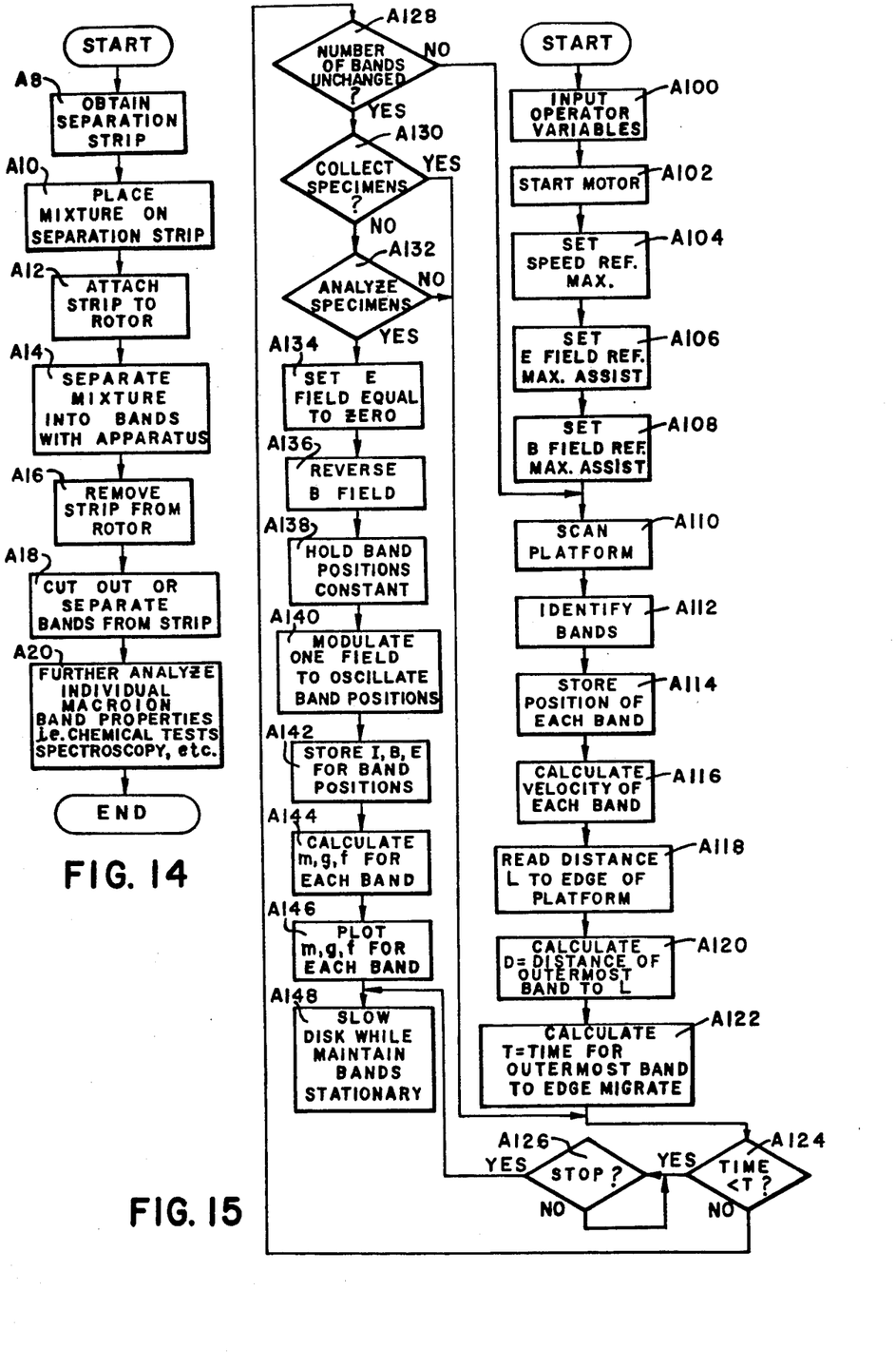
FIG. 14 is a pictorial representation of a separation process using the apparatus illustrated in FIG. 1.
FIG. 15 is a flowchart for the program which operates the separation controller illustrated in FIG. 1.

The system block diagram for the software program which controls the separation apparatus 22 is more fully illustrated in FIG. 15. This program allows for the input of operator variables in block A100 describing the operations which the apparatus is to accomplish. In one mode the apparatus will perform an analysis of the separated bands of macroions, and in another mode, it will produce a separation of the particular groups. Further, in block A100 the assisting and opposing field polarities of the magnetic and electric fields are input if the pK of the mixture is known, i.e. the net charge of the mixture.

After all the data describing the operation of the system has been input and stored, the motor 12 is started in block A102 and its velocity increased very rapidly. The speed reference is set to a maximum in block A104 along with the E field reference and B field reference in blocks A106 and A108. The reference values for the E field and B field are the current and voltage values for controllers 38, and 30, respectively. The E field reference and the B field reference are set such that they both produce forces which assist the centrifugal force in the outwardly radial direction. These maximum field forces applied to the macroion mixture produces a rapid initial separation of the groups into concentric bands about the rotational axis.

The apparatus then enters a scanning procedure in block A110 where the separation strips 100 are scanned to determine the absorbance, reflectance, or fluorescence of the material contained thereon. The optical band scanner is used to identify the macroion groups as they separate and migrate along the strips 100. In block A112 each of the bands are identified and the position of each band is stored in block A114. The identification of the position of the bands in block A112 allows a velocity calculation subroutine to calculate the velocity for each band in block A116 from the difference of two stored positions (how far the band has moved) during an increment of time (the loop interation rate). From this velocity value the apparatus determines the distance L, to the edge of the platform 10 in block A118 and then calculates the time to travel that distance to the edge for the outer most band in block A120. This produces a time value T in block A122 which is the amount of time at the present velocity that it will take outer most band to reach the edge of the platform 10.

Block A124 then tests the present time against this variable and determines whether the outermost band is about to migrate off the edge of the platform 10. If an affirmative answer to this test is produced then in block A126 an input variable indicating whether the operator desires to stop the process is interrogated in block A126. The operator resets this variable if he wants each band to migrate off the platform to perform a collection process. Thus, if the stop variable is not set the program will loop at block A126 until the operator inputs a set value for that parameter. The operator may collect each band of separated macroions in this manner as it migrates off the edge of the platform with the trough 17 as illustrated in FIG. 1.

Otherwise, if the time is less than that for the outer most band to travel off the edge of the platform 10, then the program produces a test in block A128 to determine if the number of bands has changed over a particular time period. If the number of bands does not change within a particular time period this indicates that the separation is complete and all the different groups of macroions have banded together. However, if the number of bands are still changing, then the program loops back to the block A110 where the separation loop is again entered. The exit from the separation loop is then either a condition indicating that the outer most band has migrated to the edge of the platform 10 or that the number of bands have been completely separated. Thereafter, in block A130, the program determines from the input variables whether the separate band specimens are to be collected. If the answer to this question is yes, then the program loops back to block A124 where the outer most band will finally exceed the time limit in that test and the collection process performed as indicated above.

However, if the operator does not wish to collect the specimens but rather to analyze the specimens, then in block A132 program control is transferred to an analyzing path headed by block A134. A negative answer to block A132 produces a branch back to block A124 where, before the outer most band reaches the edge of the platform, the operator may stop the separation process at any time. If the program reaches block A134, the E field is set to zero to halt its assistance of the other two forces. This permits the bands to become more pronounced and eliminates and Joule heating caused by the ion current flow induced by the E field. The B field is then reversed as to sense in block A136 to produce a magnetophoretic force which opposes the centrifugal force. The intensity of the B field is varied using the feedback signals and position detection means until the bands are held at constant positions on the platform in block A138. Thereafter, in block A140, one of the fields preferably the E field, is modulated with a small high frequency signal to provide an accurate determination of the positioning of each band.

Once the band positions have been determined they are stored by block A142 along with the values for the electric, magnetic, and centrifugal fields. This is produced by storing the reference speed, current, and voltage values for a particular constant position of one or more of the bands. Thereafter, in block A124 the mass m, charge q, and the drag coefficient f, are calculated for each band. These variables m, q, and f are then plotted in block A146 or output to a CRT terminal for further use. After the analysis portion of the program has been accomplished, the platform 10 is slowed to a zero velocity while modulating the E field and B field to maintain the bands in a stationary position. This then allows the separation strips 100 to be removed and cut apart as described in the process embodied in FIGS. 14 and 3.

Figure 16A:
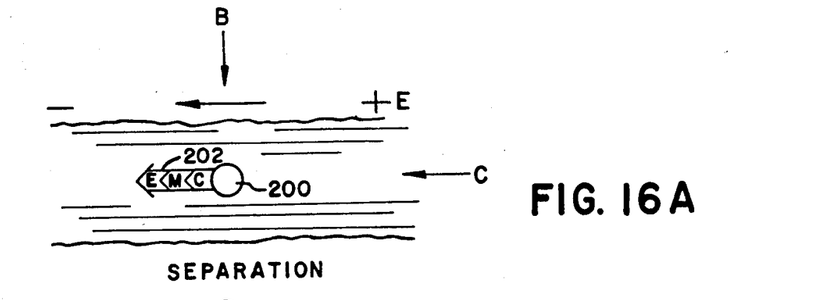
FIGS. 16A, 16B, and 16C together form a pictorial representation of the magnetic, electric, and centrifugal fields applied to a macroion mixture and the forces which they generate.
Figure 16B:
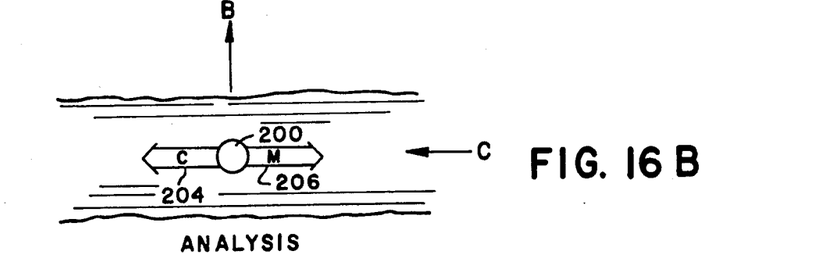
Figure 16C:
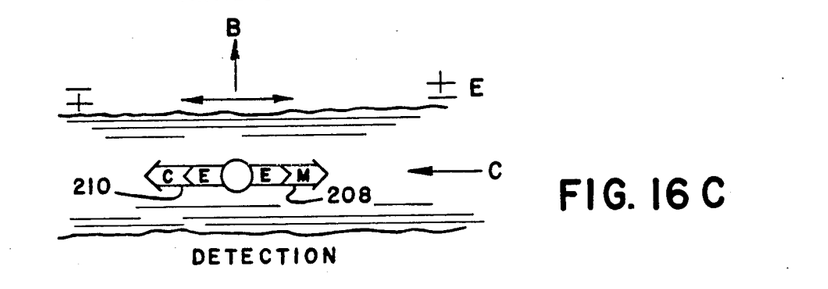

FIGS. 16A, 16B, and 16C illustrate the forces on a positively charged macroion 200 during the separation, analysis, and detection steps described above. The macroion 200 is subjected to an outwardly directed radial force 202 during the separation step. Force 202 comprising a centrifugal part C from the rotation of the platform, a magnetophoretic part m from the perpendicular magnetic field B, and optionally an electrophoretic part E from the electric field E. During the analysis step in FIG. 16B, the macroion is subjected to a balancing of forces. The magnetophoretic force 206 now opposes the centrifugal force 204 because of the reversal of the sense of the perpendicular B field. Optionally, the electrophoretic part E can be used to assist force 206 by reversing the polarity of electric field E. Preferably, the field E is not used in the analysis step except for detection assistance as shown in FIG. 16C where an alternating electric field E will produce an oscillitory electrophoretic force E which will unbalance the equilibrium condition imposed by the magnetophoretic force 208 and the centrifugal force 210. While there has been shown a method and apparatus for the separation and analysis of macrions of a mixture by a batch process, there is no reason that the apparatus described cannot be used for continuous processing of one or more mixtures. FIG. 1 illustrates a source 21 with a variable valve 23 which is adopted to produce a continuous controlled stream of macroion mixture on platform 10. The source 21, instead of being used to apply individual 10 mm. samples as described, may be continuously run to provide a process of a continuing nature.

FIG. 4 shows a more detailed illustration of the band detection means illustrated in FIG. 1 as element 68. The separation strip 100 which is being rotated on the platform 10 is illuminated by a light source 116. The light source 116 may preferably be any suitable illumination source including a monochromatic and collimated source such a HeNe laser. The light source 116 illuminates the strip 100 to provide a reflectance value which is transferred by a pivotable scanning mirror 114 to the optics of a microscope 110. The microscope optics are used to magnify the image on the separation strip 100 to provide a clear image for a conventional video camera 112. The video image of the strip 100 is transmitted on line 66 to the separation controller 22. The light source 116 can be strobiscopically synchronized to the particular strip on the rotating platform which is desired. The scanning mirror can then be further synchronized to the illumination source 116 so that an image of each entire strip 100 is provided by a plurality of reflectance values for every rotation of the platform.

Figure 5:
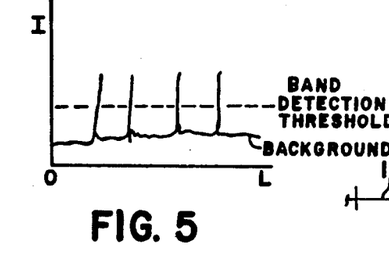
FIG. 5 is a pictorial representation of image intensity as a function of position as measured by the separation apparatus illustrated in FIG. 1.

By synchronizing the particular illumination source 116 to the separate strips 100, the separation controller 22 is provided an image in gray scale or reflectance values as a function of position as shown in FIG. 5 for the macroion bands of each strip. The macroion groups as they separate from the other different ions of the mixture and group together, are different in reflectance value than the surrounding or background medium. The macroions bands image as darker (more absorbent) areas along the positions of the strips 100. By thresholding or peak detecting these darker areas on a gray scale image, as seen in FIG. 5, the positions of each particular macroion group or band may be readily discerned. Conventional optical techniques and image processing can be used to translate these images into positional data which describe the position and velocity of the bands along the separation strip 100.

The long distance microscope 114 can be a conventional Katoptaron with a model number of LDM-1 which is made by H&R Optical Systems, Inc. of Cologne, West Germany. The long distance microscope works on the principal of reflection and assures the image is of absolutely true color or gray scale with no color fringing. Generally, a long distance microscope 110, as illustrated in FIG. 4, has a relative power of 50×-100× from a focal length of 32-60 inches and can readily discern the bands as they separate.

Figure 6:
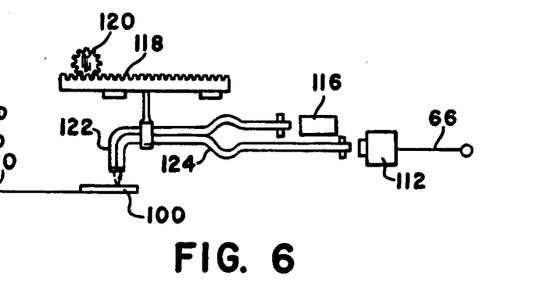
FIG. 6 is a detailed schematic view of another embodiment of the band detection means illustrated in FIG. 1.

FIG. 6 illustrates another embodiment of the band detection means 68 which includes a fiber optics scanner, including light transmitter fiber 122 and light receiver fiber 124. The light transmitter fiber 122 is fed at one end by a suitable illumination source 116 which can be identical to that previously described in FIG. 4. The transmitter fiber carries the light to the surface of the separation strip 100 where it is reflected therefrom to the receiver fiber 124 for transmission to a conventional video camera 112. The image received by the video camera 112 is transferred to the separation controller 22 via the signal line 66. In this embodiment, the reflectance of the source light off the separation strip 100 because of the macroions separating into different band groups provides different reflectance values at the optics of the video camera 112. These different reflectance values are transmitted and imaged in much the same way as described previously to provide the macroion band detection as illustrated in FIG. 5. The scanning of the fiber optics mechanism illustrated in FIG. 6 is provided by a rack 118 and pinion 120 which move in a linear scanning motion sychronized to the passage of the separation strips by the scanner.

Figure 7:
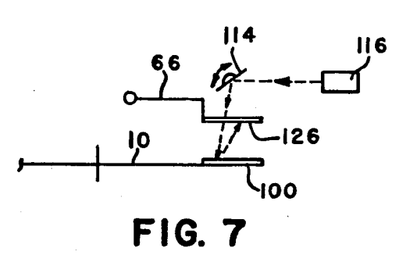
FIGS. 7, 8, and 9 are detailed schematic views of variations of still another embodiment of the band detection means illustrated in FIG. 1.
Figure 8:
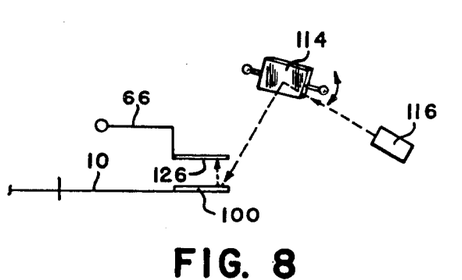
Figure 9:
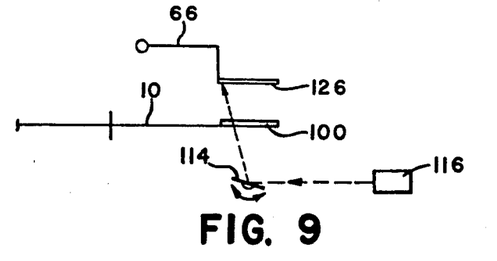

FIGS. 7, 8, and 9 illustrate further embodiments of the band detection means 68 which have substituted a linear light position detector in the form of a photo detector strip for the video camera and optical apparatus in the previous embodiments. In FIG. 7 there is shown a light source 116 with a scanning mirror 114 which reflects the light from source 116 onto the separation strip 100. The scanning of the light source and synchronization of the movement of the mirror 114 and illumination are as similarly described for FIG. 4. The light is reflected off the strip 100 in various intensities depending upon the positions of the macroion groups and is detected along the linear extent of the photo detector strip 126. The photo detector strip 126 converts the linearly moving spot of light from the scanning into different intensity values and transmits them along with their position through line 66 to the separation controller 22. Because each detector sends out the light intensity hitting it and its code number, the position of the light scan along the strip can be detected and sent to the monitoring means to determine the change in position with respect to time that the bands are experiencing. The photo detector strip preferably contains a linear array of extremely small silicon photo detectors. A commercial array available for this use contains 2,000 detectors/in. and is available as Model No. LSC from the United Detectors Technology Corporation of California.

FIG. 8 is a similar configuration for scanning the separation strips 100 with a photo detector strip 126, a scanning mirror 114 and light source 116. The scanning mirror 114 and light source 116 are offset so they are not directly above the photo detector strip as in FIG. 7. This provides a greater angle of reflection for the light with a consequent greater accuracy of position determination.

A similar configuration of a photo detector strip 126, a scanning mirror 114 and light source 116 are shown in FIG. 9. In FIG. 9 the difference is that instead of reflectance, the photo detector 126 is measuring by the absorbence of the microion bands migrating along the strip 100. The platform 10 in this illustration is preferably comprised of LEXAN or other suitable transparent or relatively translucent materials. The light source provides a beam which is scanned through the platform 10 and separater strip 100 to provide a position and intensity profile which is converted by the strip detector 126 and output to the separation controller 22 via line 66.

Figure 10:
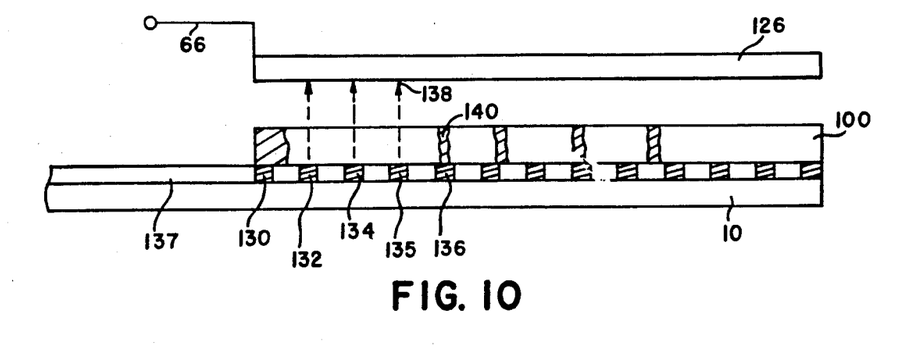
FIGS. 10 and 11 are detailed schematic views of variations of yet another embodiment of the band detection means illustrated in FIG. 1.
Figure 11:
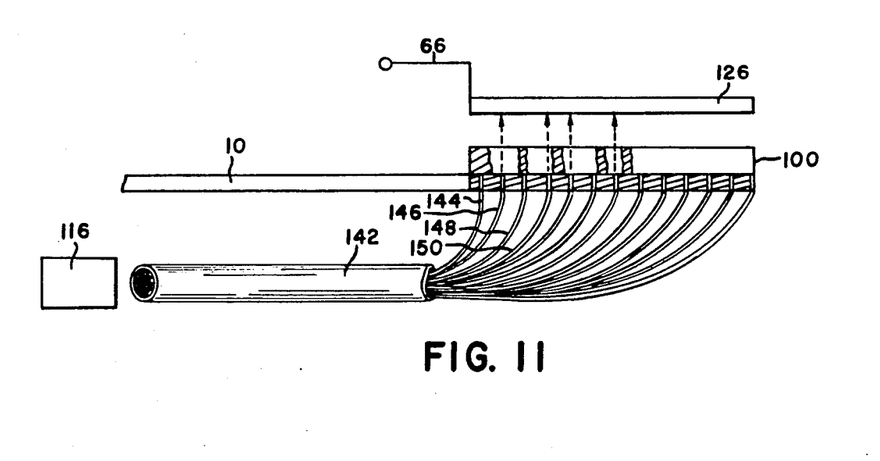

FIGS. 10 and 11 show alternative embodiments for the band detection means 68 which are discrete in nature and require no separate mechanical scanning means. On each radial segment of the platform 10 which mounts a separation strip 100, there is underlayered a plurality of spaced photo diodes, for example 130, 132 and 134. The photo diodes are evenly spaced and individually located to provide point sources of light which can be transmitted through the separation strip 100 and thereafter received by a photo detector strip 126 as has been previously described. The scale of the diode in the drawing has been exaggerated to more clearly point out the operation of the embodiment. The photo detector strip 126 converts the light points from each photo diode 130, 132 and 134 etc. into a signal which is transmitted to the separation controller via line 66. As each separation strip 100 rotates under the detector strip 126, the detector receives light points from those photo diodes which have no blockage between them and the photo detector strip 126. For example, the photo diode 135 transmits its point source of light to point 138 on the detector strip 126. However, for a macroion band shown at 140, there is an absorption of the light source 136 which causes a absence of a point of light at the photo detector. This information on intensity and position is transmitted to the separation controller 22 to provide an image of the macroion bands as they move along the separation strip 100 and permit the controller to determine their position and velocity along the strip.

In FIG. 11 a similar embodiment to that illustrated in FIG. 10 is shown except for the photo detectors imbedded in the platform 10 there has been substituted the separate fibers of an optical fiber bundle 142. The fibers 144, 146, 148, 150, etc. provide the point sources of light as did the photo diodes in the previous figure from a single light source 116. The operation of this embodiment is similar to that in FIG. 10 in that the photo detector strip 126 converts the light points from the discrete sources into a signal for transmission over line 66. When a macroion band interferes with the transmission and absorbs the light from the discrete source, that position is recorded by the detector strip and is transmitted to the separation controller 22. As the separation bands move along the strip 100 over the discrete sources in a linear fashion, their point source transmissions will be interfered with and the positions with respect to time of the bands determined by the controller from this information.

Figure 12:
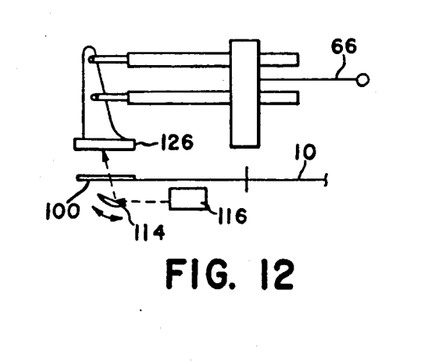
FIG. 12 is a detailed schematic of another embodiment of the band detection means illustrated in FIG. 1.
Figure 13:
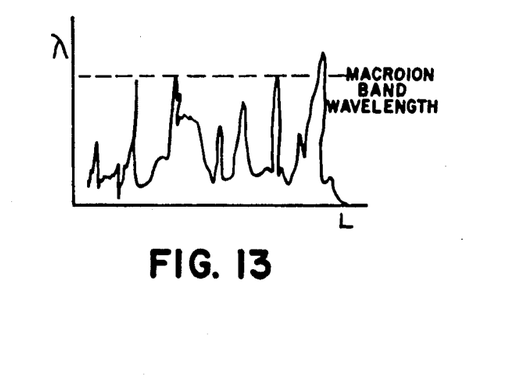
FIG. 13 is a pictorial representation of wave length as a function of position as measured by the band detection means illustrated in FIG. 12.

FIGS. 12 and 13 illustrate another embodiment of the scanning means which uses a photo detector strip 126 responsive to ultraviolet wavelengths of light. FIG. 13 illustrates the result of a scan where the wavelength of the ultraviolet radiation received is plotted against the length L along a strip 100. Particular macroions are identified by the wavelength they either absorb or reflect and positioning and selection of an individual group can be effected in this manner.

While the preferred embodiments of the invention have been illustrated, it will be obvious to those skilled in the art that various modifications and changes may be made thereto without departing from the spirit and scope of the invention as defined in the appended claims.

What is claimed is:

1. A method for characterizing the mass and charge of a plurality of macroions in a mixture of macroions, said method comprising:

generating a controllable centrifugal force on said macroions by rotating a quantity of said mixture substantially in a plane such that different radial velocities are produced on the plurality of macroions depending upon their mass;

applying a magnetic field of a controllable magnitude and direction such that a Lorenz force is generated to assist or oppose said centrifugal force in the radial direction, said Lorenz force acting on said macroions according to their charge and tangential velocity;

separating said macroions along the plane because of their different radial velocities such that a profile of velocities are developed along the radial direction of said plane;

reversing and controlling said magnetic field so that the Lorenz force acts substantially equally and oppositely to said centrifugal force and produces a stopage of the motion of said macroions in said radial direction;

applying an electric field of a controllable magnitude and direction such that an electrophoretic force is generated assisting said centrifugal force in the radial direction prior to reversing said magnetic field;

measuring the distribution of radial positions at which macroions group together; and determining the mass and charge of the macroions of said mixture from the values of the magnetic field, the electric field, the centrifugal field, and the radial positions.

2. A method for characterizing the mass and charge of a plurality of macroions as defined in claim 1 which further includes the step of:

reversing and controlling said electric field so that said electrophoretic force acts substantially oppositely to said centrifugal force, and the combinations of said electrophoretic force and said Lorenz force produces a stopage of the macroions in said radial direction.

3. A method for characterizing the mass and charge of a plurality of macroions as defined in claim 2 wherein the step of determining includes the step of solving the equation:

$$r = \frac{qE}{m\gamma^2 + q\gamma B}$$

where
r = the radial distance of a group of macroions from the center of rotation,
$\gamma$ = the angular velocity,
E = the electric field vector,
B = the magnetic field vector,
m = the mass of a macroion, and
q = the net ionic charge on a macroion.

4. An apparatus for separating a mixture of macroions contained in a fluid of a certain dielectric constant and ionic strength, said apparatus comprising:

means for rotating a quantity of said macroion fluid substantially in a plane so that a separation of the macroions occurs because of a centrifugal force acting in the radial direction of said plane, said separation causing groupings of said macroions in bands having radial velocities which are related to the macroion mass;

means for controlling the angular velocity of said rotation means;

means for generating a magnetic field perpendicular to said plane causing a Lorenz force to act in a radial direction to separate said macroions according to their charge and angular velocity;

means for controlling the direction and intensity of said magnetic field;

means for generating an electric field in said rotational plane and directed radially causing an electrophoretic force to be applied to said macroions according to their charge;

means for controlling the direction and intensity of said electric field;

means for detecting the radial position of a group of macroions on said rotational plane separated by their mass and charge; and means, responsive to said detecting means, for regulating said angular velocity controlling means, said electric field controlling means, and said magnetic field controlling means based upon the position of at least one of said macroion bands such that the radial velocity of said band may be controlled.

5. An apparatus for controlling the separation of a group of macroions as defined in claim 4 wherein said electric field generating means includes:

electrode means spaced apart on said rotating means such that a radial electrical field is produced between two of said electrode means when a potential is applied thereto; and means for applying a variable potential between two of said electrode means.

6. An apparatus for controlling the separation of a group of macroions as defined in claim 5 wherein said variable potential generating means include:

a voltage source for applying a variable potential signal to said two electrode means, said voltage source generating said potential signal based on the difference between an actual potential signal and a reference potential signal;

means for generating said actual potential signal as indicative of the actual variable potential applied to said electrode means;

wherein said reference potential signal is generated by said regulating means as indicative of a commanded electric field between said electrode means.

7. An apparatus for controlling the separation of a group of macroions as defined in claim 6 wherein:

said regulating means includes means for selecting whether the variable potential signal is AC or DC.

8. An apparatus for separating a mixture of macroions into discrete groupings having the same mass and net ionic charge comprising:

means for applying a centrifugal force to said mixture;

means for applying a Lorenz force to said mixture; and means for applying an electrophoretic force to said mixture;

wherein said groupings are obtained by the combined interactions of said centrifugal force, said Lorenz force, and said electrophoretic force acting on individual macroions in said mixture.

9. An apparatus as set forth in claim 8 wherein:

said means for applying said Lorenz, centrifugal, and electrophoretic forces include means for causing said forces to act in the same direction on said macroions so that the time to separate the mixture into discrete groups is minimized.

10. An apparatus as set forth in claim 8 further including:

a medium with a known dielectric constant and ionic strength; and wherein said macroions are mixed in said medium to form the mixture.

11. An apparatus as set forth in claim 10 wherein:

said medium is porous and comprised of one of the group consisting of a polymeric gel and a filter paper, said medium containing a fluid of a certain dielectric constant and ionic strength in which the macroions of the mixture may freely migrate under said electrophoretic, centrifugal, and Lorenz forces.

12. An apparatus as set forth in claim 8 wherein said centrifugal force applying means includes:

a disk for rotating the macroion mixture in a substantially horizontal plane at a specific angular velocity, said rotation causing the separation of the macroions into bands because of said centrifugal force acting upon the mass of every macroion; said bands having an outward migration with respect to the center of rotation and a radial velocity dependent upon the mass of the macroions in said bands and the drag coefficient of the mixture.

13. An apparatus as set forth in claim 12 wherein said centrifugal force applying means further includes:
   means for cotrolling the angular velocity of the disk to a high degree of precision including a feedback controller for generating a motor drive signal to a motor which rotates the disk, said motor drive signal being based on the actual rotational velocity as measured by a tachometer and a reference rotational velocity.

14. An apparatus as set forth in claim 12 wherein said Lorenz force applying means includes:
   means for applying a magnetic field to said mixture with flux lines perpendicular to the plane of rotation of said disk; said Lorenz force being generated as the cross product of the tangential velocity of the macroions and said magnetic field, wherein said tangential velocity is a function of the angular velocity of said disk and the radial position of the macroions on said disk, whereby the Lorenz force causes said separation through interaction with the net ionic charge on the macroions.

15. An apparatus as set forth in claim 14 wherein said means for applying a magnetic field comprises:
   an electromagnet which is controlled to a high degree of precision by a current source driving current through the coils of said electromagnet, said driving current based upon the actual current measured at the surface of the disk by a flux meter and a reference current.

16. An apparatus as set forth in claim 15 wherein said current source includes:
   means for controlling the direction of the flux and the magnetic field strength of said electromagnet by the polarity and intensity of the driving current such that the magnetic field is variable in intensity and flux direction.

17. An apparatus as set forth in claim 8 wherein said means for applying an electrophoretic force include:
   a pair of separated electrodes in contact with the medium for producing a radially directed electrophoretic field when a potential is applied across said electrodes, whereby the macroions are separated due to the interaction of the electrophoretic force with the net ionic charge on a macroion.

18. An apparatus as set forth in claim 17 further including:
   a constant voltage source for controlling said potential across said electrode to a high degree of precision.

19. An apparatus as set forth in claim 8 which further includes:
   processor means for controlling said means for applying said electrophoretic, Lorenz, and centrifugal forces, wherein the magnitude and direction of said electrophoretic, Lorenz and centrifugal forces are controlled such that an integrated control of said forces is achieved.

20. A method of characterizing the mass and net ionic charge of a plurality of macroions in a mixture with the apparatus set forth in claim 8, said method comprising the steps of:
   separating the macroions into groups related by mass and net ionic charge, which migrate radially outward on a rotating platform;
   varying said centrifugal, Lorenz, and electrophorectic forces such that one group of macroions having a specific mass and net ionic charge is stopped at a fixed position while other macroion groups of a different mass and net ionic charge continue to migrate;
   identifying the position where said macroion group stopped migrating; and
   calculating the mass and net ionic charge from the identified position and the following equation:

$$r = \frac{qE}{m\gamma^2 + q\gamma B}$$

where
r = the identified position;
$\gamma$ = the angular velocity producing said centrifugal force;
E = the electric field vector producing said electrophoretic force;
B = the magnetic field vector producing the Lorenz force;
m = the mass of said identified group; and
q = the ionic charge of said identified group.

* * * * *

UNITED STATES PATENT AND TRADEMARK OFFICE
CERTIFICATE OF CORRECTION

PATENT NO.   :   4,726,904
DATED        :   February 23, 1988
INVENTOR(S)  :   William M. Ayers It is certified that error appears in the above-identified patent and that said Letters Patent is hereby corrected as shown below:

Column 2, Line 36:   After "assisting", change "a" to --the--.

Column 5, Line 68:   Delete Line 68 in its entirety.

Column 6, Line 16:   Change "k<0" to --k>0--.

Column 7, Line 65:   Change "$4\pi\ _0^\infty$" to --$4\pi\int_0^\infty$--.

Column 10, Line 57:  After "A/D converter" insert --64--.

Signed and Sealed this

Sixth Day of December, 1988

Attest:

DONALD J. QUIGG

*Attesting Officer*         *Commissioner of Patents and Trademarks*